Dec. 30, 1947.  C. W. CHILLSON ET AL  2,433,432
PROPELLER SYNCHRONIZING APPARATUS
Filed May 14, 1941  4 Sheets-Sheet 3

INVENTORS
CHARLES W. CHILLSON and
GEORGE W. BRADY.
BY
ATTORNEYS

Dec. 30, 1947. C. W. CHILLSON ET AL 2,433,432
PROPELLER SYNCHRONIZING APPARATUS
Filed May 14, 1941 4 Sheets-Sheet 4

INVENTORS
CHARLES W. CHILLSON and
BY GEORGE W. BRADY.
ATTORNEY

Patented Dec. 30, 1947

2,433,432

UNITED STATES PATENT OFFICE 2,433,432

PROPELLER SYNCHRONIZING APPARATUS

Charles W. Chillson, Lake Packanack, and George W. Brady, Upper Montclair, N. J., assignors to Curtiss-Wright Corporation, a corporation of Delaware Application May 14, 1941, Serial No. 393,400

5 Claims. (Cl. 175—355)

This invention relates to synchronizers for multiple power plants and is concerned particularly with a system and the necessary mechanism by which the speed of a plurality of aircraft engines may be controlled to uniformity and to synchronism with a master constant speed motor.

The invention is exemplified in connection with electrically actuated controllable pitch propellers which form the speed control means for the engines.

Pitch change in the propellers changes the engine driven load—if this load is increased, the engine speed is reduced and if this load is decreased, engine speed increases.

A particular object of the invention is to provide mechanism by which the speed of one or more prime movers may be synchronized with a master speed control and in this connection, a single master speed control may be utilized for any number of prime movers. A further object of the invention is to provide a mechanism responsive to speed differences between the master control and the prime mover which will correct the speed of the prime mover gradually and without tendency toward hunting. When the control system is electrical in character, speed control is secured by energizing the speed correcting mechanism for intervals of time which are substantially proportional to the degree of lack of synchronism between the master control and the prime mover. Other objects of the invention comprise the provision of specific electrical and mechanical devices to assure proper functioning of the system, which objects will become apparent in reading the annexed detailed description in connection with the drawings, in which:

Figure 2:
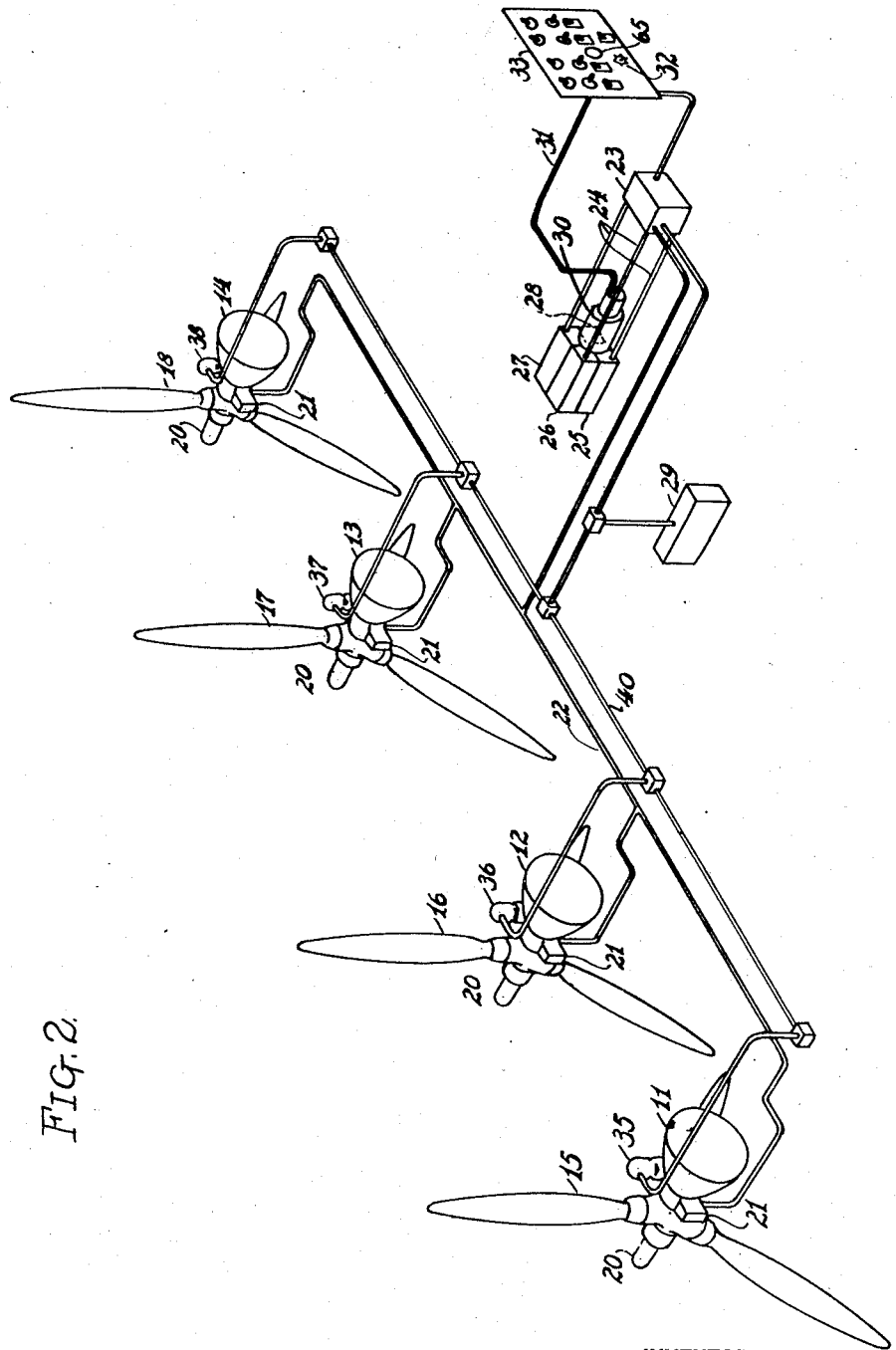
Fig. 2 is a perspective diagram of a plurality of aircraft power plants and their relationship to the synchronizer mechanism.

Referring first to Fig. 2, we show aircraft engine power plants 11, 12, 13, and 14 each of which is provided with a controllable pitch propeller respectively designated 15, 16, 17, and 18 whose change in pitch is secured through electric motors 20 geared to the blades of the propellers in a manner which is well known in the art. The electric power for pitch change in the several propellers is supplied thereto through slip ring assemblies 21 connected through a conduit 22 to a junction box 23 and thence through conduits 24 to contactor assemblies 25, 26, 27, and 28, respectively provided for the propellers 15, 16, 17, and 18. Power for pitch changing is furnished from a battery 29 or other suitable power source. The master speed control motor is indicated at 30 and this device drives portions of the several contactor assemblies in a manner which will shortly become apparent. Selective adjustment of the speed of the master motor 30 is afforded through a flexible drive unit 31 connected to a turntable knob 32 on a control panel 33 which panel is further provided with switches necessary to the complete control of the propeller system. Electrical connections from the panel 33 are coordinated with those of the electrical units in the junction box 23.

Each engine is provided with a small A. C. alternator, these alternators being indicated at 35, 36, 37, and 38 and their output is carried through appropriate wiring in a conduit 40 to the junction box 23 and through the conduits 24 to respective contactor assemblies 25, 26, 27, and 28.

Figure 1:
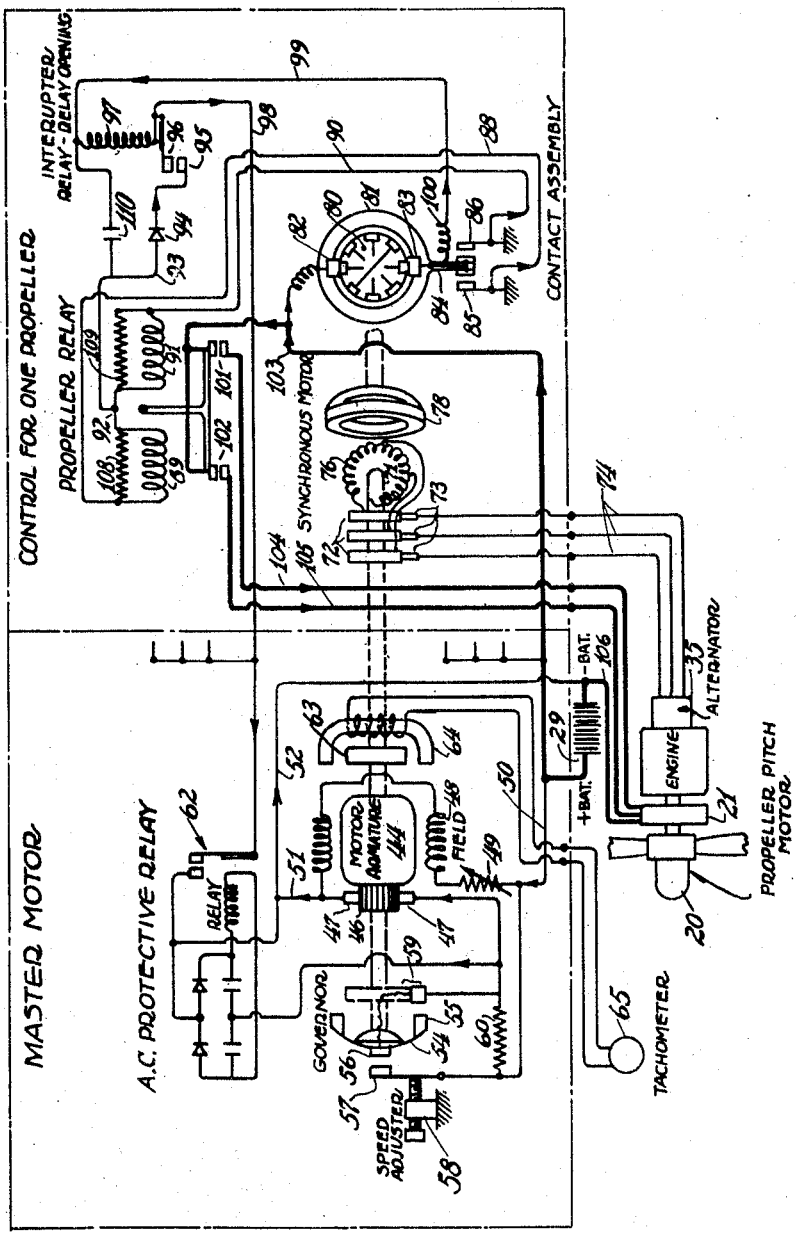
Fig. 1 is a functional wiring diagram of the essential devices of the invention.
Figure 3:
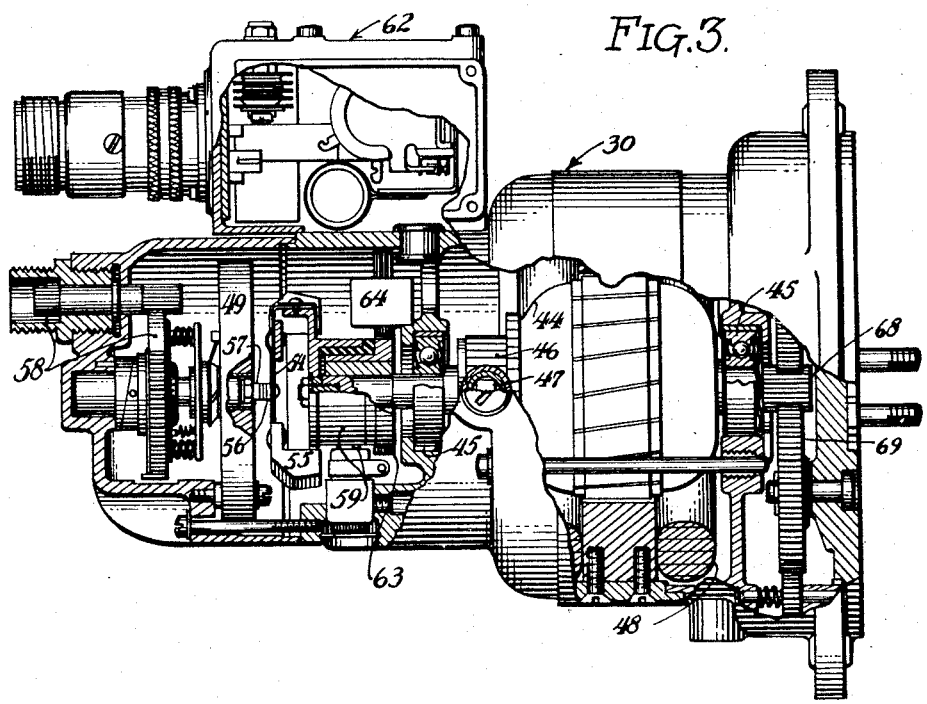
Fig. 3 is a side elevation partly broken away and partly in section, showing the master speed control motor.

Fig. 3 shows the mechanism of the master motor 30 while the lefthand box of Fig. 1 shows the electrical connections thereof. The master motor is a D. C. shunt wound device comprising an armature 44 carried in bearings 45 and provided with a commutator 46 engaged by brushes 47. The shunt field 48 for the motor is series connected with a variable resistance 49 connected by a wire 50 to the positive terminal of the battery 29. The other end of the field is connected through wires 51 and 52 to the negative pole of the battery.

A governor assembly for the motor includes a spring 54 secured to the motor shaft which spring carries governor weights 55 and a central contact point 56 engageable with a fixed contact point 57 whose position may be adjusted coincidentally with variation in the resistor 49 by a mechanism 58 to set the speed at which the master motor is to operate. The contact point 56 is connected through a slip ring and brush 59 to the lower brush 47 of the motor commutator, while the fixed contact 57 is connected to the positive pole of the battery. The contact points 56 and 57 are shunted by a resistor 60 which bypasses a portion of the motor armature power relieving the contact points of the governor of a substantial portion of the load which they would otherwise have to break. It will be seen that the contacts 56 and 57 of the governor are in series with the motor armature and when operating, the governor contacts open and close at a frequency of several hundred cycles per second to pass, through the motor armature, an average amount of current necessary to maintain the armature at correct speed. If the armature is not operating at correct speed, the governor contacts 56 and 57 will either ride open, in which case there is inadequate current flow through the armature, or will ride closed in which case there is continuous D. C. through the armature. When operating properly, the governor controlled current is interrupted D. C. which passes through the motor armature. This characteristic is utilized for automatic protection of the control system by an A. C. protective relay 62 associated with the master motor, this relay being responsive in its closure only to the passage of alternating current to the relay, the latter opening should the current thereto be D. C. or nil. The switch of the relay makes or breaks the main negative control wire to the contactor assemblies 25, 26, 27, and 28, as will become apparent. When this switch is open, the propellers stay in fixed pitch.

The motor armature is further provided with a permanent magnet 63 electromagnetically coupled to a field 64 to comprise a single phase A. C. generator whose output is delivered to a frequency responsive electric tachometer 65. The speed adjuster mechanism 58 is coupled to the control cable 31 and the control knob 32 of Fig. 2 for panel control of master motor speed.

Figure 4:
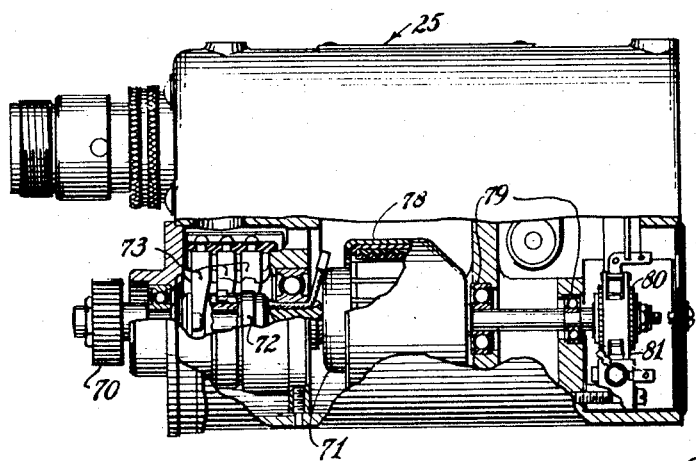
Fig. 4 is a side elevation, partly broken away and partly in section, showing one of the contactor assemblies.
Figure 5:
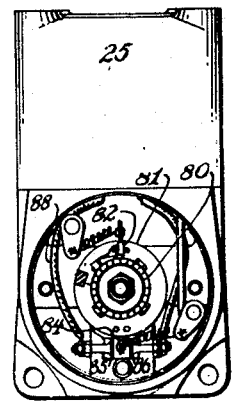
Fig. 5 is an end view of a contactor assembly.

The righthand end of the motor armature 44 carries a pinion 68 meshed with idler gears 69 which in turn are meshed with a drive pinion 70 on each of the contactor assemblies 25, 26, 27, and 28, these assemblies being secured to the end face of the master motor 30 in their proper relation to assure mechanical drive through the gears 68, 69, and 70. Since all of the contactor assemblies are identical, one only (25) will be described and one only is shown in Figs. 4 and 5. The assembly includes a rotor 71 direct connected with the pinion 70 and carrying three slip rings 72 with which are engaged brushes 73 connecting through the conduit system of Fig. 2 with the engine driven alternator 35. The rotor 71 comprises a winding 76 which, as shown, is delta connected to the slip rings 72. The electromagnetic field produced in the winding 76 when the alternator is running at speed, rotates in a direction opposite to the mechanical rotation of the armature 71 so that, when the alternator and the master motor are in synchronism, the electromagnetic field from the winding 76 stands still. However, any difference in rotational speed between the rotor 71 and the electromagnetic field will cause an advance or retreat of the field with respect to the stationary contactor assembly housing. The rotor 71 is embraced in part by a rotatable stator 78 which is electromagnetically linked in the field produced by the winding 76 so that the stator 78 will either lie stationary or will rotate clockwise or counterclockwise in response to synchronism, or to lack of synchronism in either direction between the master motor and the engine. The stator 78 is carried in bearings 79 and a shaft extension thereon carries a commutator 80 whose opposed bars, as shown in Fig. 1, are connected together. A brush carrier 81 embraces the commutator 80 and includes a brush 82 which is connected with the positive battery terminal, and a directly opposite brush 83 connected to a contact point 84 on an arm of the carrier which may engage either of two spaced contacts 85 or 86 according to the direction of rotation of the commutator 80. The contact point 85 is connected by a wire 88 to one end of a propeller relay coil 89, and the contact point 86 is connected through a wire 90 to the end of a propeller relay solenoid 91. The other ends of the solenoids 89 and 91 are connected together at 92 whence a wire 93 leads to a rectifier 94 and thence to the fixed contact 95 normally engaged with a movable contact 96 forming the switch of a delay opening interrupter relay whose solenoid 97 is connected at one end to the relay armature which carries the contact 96, and also to the negative pole of the battery through a wire 98, the switch of the protective relay in the master motor and the wire 52. The other end of the solenoid 97 of the interrupter relay is connected through a wire 99 and a pigtail 100 to the brush 83 of the carrier 81.

With the circuit arranged as shown in Fig. 1, a bar of the commutator 80 is in engagement with the brushes 82, 83 and, hence, current flows from the positive side of battery 29 through the brushes 82, 83 and thence by way of connection 100 and conductor 99 to one terminal of the solenoid 97, the other terminal of which is connected to the negative side of battery 29 by way of the conductor 98, the switch of the protective relay in the master motor and the wire 52. As a result, the solenoid 97 is energized, the contacts 95 and 96 are opened and it is impossible to energize either of the windings 89, 91 at this time.

Should rotation of the commutator 80 in a counter-clockwise direction, Fig. 1, be initiated, the brush holder 81 moves therewith until the contact 84 engages the contact 86 whereupon movement of said brush holder 81 ceases. As rotation of the commutator 80 continues, the aforesaid bar of the commutator 80, which was described as in engagement with the brushes 82 and 83, becomes disengaged therefrom and moves into a dead space whereupon the described circuit through the solenoid 97 is opened with resultant closure of the switch 95, 96. As soon as the next succeeding bar of the commutator 80 comes into engagement with the brushes 82 and 83, the circuits through the solenoid 97 and the winding 91 are closed. The solenoid 97 is of the delay-opening type and, hence, a short interval of time elapses before the contacts 95 and 96 open to open the circuit through the winding 91. The propeller relay is constructed with a delay opening characteristic so that a switch 101 thereof which has been closed by propeller relay energization will remain closed for a finite time interval of the order of a tenth of a second which is a sufficient time interval to energize the propeller pitch motor 20 to afford a small change in propeller pitch in the direction appropriate to bring engine speed into synchronism with the master motor. The propeller relay also includes a power switch 102 which is closed in the same manner as above described when the solenoid 89 is energized. The switches 101 and 102 are connected on one side to the positive battery terminal through a heavy conductor 103. The other side of the switch 101 is connected by a heavy conductor 104 to one of the slip rings in the assembly 21 while the other side of the switch 102 is connected by a heavy conductor 105 to another of the slip rings of the assembly 21. The third slip ring in the assembly 21 is connected by a heavy conductor 106 to the negative terminal of the battery.

In case the conditions should be such that the commutator 80 is rotating at relatively high speed, succeeding bars thereof engage and recede from the brushes 82, 83 with such rapidity that the contacts 95 and 96 do not open, this non-opening characteristic of said contacts 95 and 96 arising by reason of the fact that the solenoid 97 is of the delay opening type. Obviously, at this time, the propeller pitch motor 20 remains energized to effect a large change in propeller pitch.

The propeller relay solenoids 89 and 91 are shunted by resistors 108 and 109 respectively, which afford the delay opening characteristic for the relay. A condenser 110, connected from the return lead 93 of the propeller relay solenoids to the wire 99, shunts either propeller solenoid which may be in operation, this condenser serving to smooth out energy supplied to the propeller relays when the commutator interruptions are at high frequency due to a large off-speed condition. The rectifier 94 under similar off-speed conditions serves to prevent a similar smoothing out of the energy supply to the interrupter relay solenoid, so that this solenoid receives only high frequency impulses which are insufficient to operate it.

By the structure above described, energization of the propeller pitch changing motor is made for constant length intervals, the intervals occurring at a frequency proportional to the speed of rotation of the commutator 80. If the speed of rotation of the commutator 80 is substantial, these constant length intervals will overlap so that the propeller relay is held in engagement and continuous current is supplied to the propeller pitch motor. If the speed of rotation of the commutator 80 is low, only occasional jogs of electrical energy will be transmitted to the propeller pitch motor to afford gradual correction of propeller pitch to attain engine synchronism with the master motor when synchronism is almost exact. In other words, the average amount of current supplied to the propeller pitch motor to correct the speed condition is, in general, proportional to the extent of the off-speed condition between the engine and the master motor.

Figure 6:
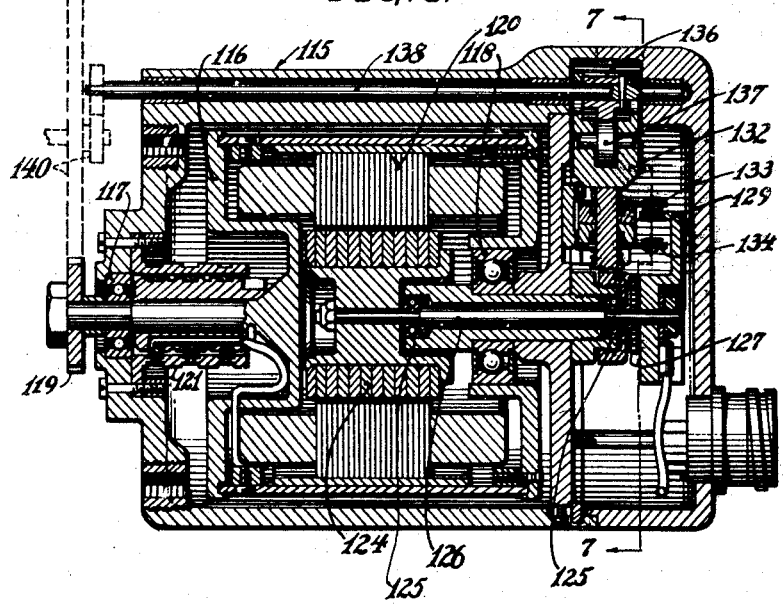
Fig. 6 is a longitudinal section through an alternate form of contactor assembly.
Figure 7:
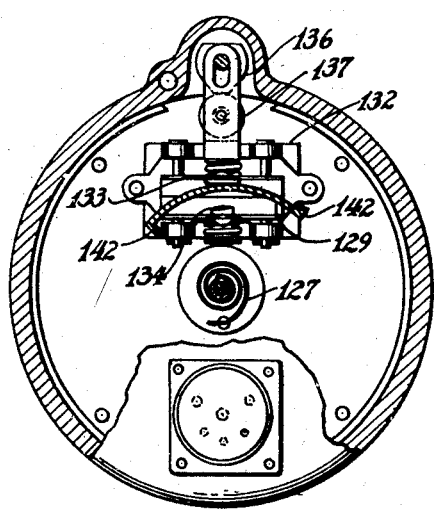
Fig. 7 is a section on the line 7—7 of Fig. 6.
Figure 8:
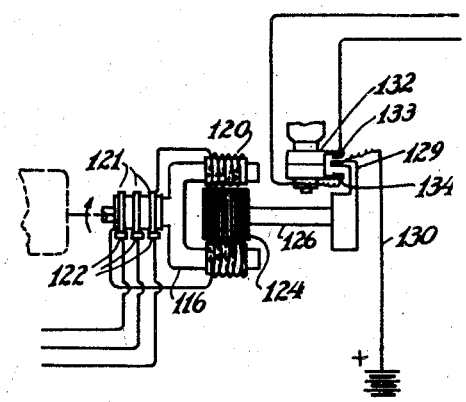
Fig. 8 is a fragmentary wiring diagram appropriate to the contactor assemblies of Figs. 6 and 7.

In Figs. 6, 7, and 8, we show an alternate arrangement of contactor assembly designated as 115. This device includes a rotor 116 carried in bearings 117 and 118 and driven through a pinion 119 from the master motor previously described. The rotor includes windings 120 connected through slip rings 121 and brushes 122 to the engine alternator 35, and, in the manner similar to that previously described, the electromagnetic field produced by the windings 120 is stationary when engine speed and master motor speed are synchronous. The field drifts rotationally to right or left as an off synchronism condition exists. A squirrel cage type stator 124 lies in the electromagnetic field and is borne by the housing of the assembly in bearings 125, the stator shaft 126 being oscillatable against a centering spring 127 and being displaced to right or left, as shown in Fig. 7, in accordance with the torque resulting from slip between the electromagnetic field and the stator 124. The shaft 126 carries a substantially spiral cam 129 which forms a switch contact connected to the positive battery terminal by a wire 130. Mounted in the housing is a radially reciprocable contact carrier 132 having an upper contact 133 engageable at times with the upper surface of the contact 129 and carrying a lower contact 134 engageable at times with the lower surface of the contact 129. The contacts 133 and 134 are connected by suitable conductors to the propeller slip ring assembly 21 and thence to the propeller pitch changing motor.

Closure of the contacts 129 and 133 will serve to change propeller pitch in one sense while closure of the contacts 129 and 134 will serve to change propeller pitch in the other sense. The carrier 132 is continually reciprocated by a cam 136 which engages a roller 137 journalled in the carrier, the cam 136 being carried on a shaft 138 which is rotated continually by the master motor through gearing 140. The contacts 133 and 134 are yieldably mounted so that, as the carrier 132 is reciprocated when the cam contact 129 is off center, contact of varying dwell but at constant frequency will be made between the element 129 and either of the contacts 133 or 134. The element 129 includes end abutments 142 engageable with the reciprocating contact points to prevent movement of the element 129 beyond established limits. The slope of the element 129 is so arranged that it will make continued contact with one of the points 133 or 134, despite reciprocation of the carrier 132, when the element 129 is at either extreme position. This will provide for continuous energization of the propeller pitch changing motor when the off speed condition between the engine and the master motor is great. As the off speed condition diminishes, interrupted contacts are established to bring propeller pitch gradually to the position for engine synchronism. As in the first embodiment, the average current supply to the propeller pitch changing motor will be generally proportional to the amount of off speed between the engine and master motor.

The principal difference in the second embodiment is that interrupted current jogs to the propeller pitch motor are made at constant frequency and varying dwell whereas, in the first embodiment, the jogs were given at varying frequency and constant dwell.

In the appended claims, the references to "proportional" or its derivatives shall be understood as generically describing intermittent energization, varying in accordance with the extent of the off-synchronism condition, of the speed-changing means recited whether caused by variation in duration of energy applications thereto or by variation in frequency of energy applications thereto.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an engine speed control system, a constant speed datum, a member controlled by the datum and the engine to rotate at a speed proportional to the speed difference between said datum and engine, an engine speed controlling electric motor, a control circuit therefor, an interrupter in said circuit actuated by, and at a frequency proportional to the speed of said member, a delay opening relay whose solenoid is in said control circuit, and an operating circuit for the speed controlling electric motor controlled in its opening and closing by said relay, the delay time dwell of said relay being greater than the cyclic interval of said interrupter when said member is rotating at more than a certain speed of rotation.

2. In an engine speed control system, a constant speed datum, a member controlled by the datum and the engine to rotate at a speed proportional to the speed difference between said datum and engine, an engine speed controlling electric motor, a control circuit therefor, an interrupter in said circuit actuated by, and at a frequency proportional to the speed of said member, a delay opening relay whose solenoid is in said control circuit, and an operating circuit for the speed controlling electric motor controlled in its opening and closing by said relay whereby, when the cyclic interval of said interrupter is greater than the relay delay, said electric motor will be energized for periods of constant dwell said periods being at a frequency proportional to the speed difference between the datum and the engine, and, when the cyclic interval of said interrupter is less than the relay delay, said relay will effect continuous energization of the speed controlling electric motor.

3. In an engine speed control system, a constant speed datum, a member controlled by the datum and the engine to rotate at a speed proportional to the speed difference between said datum and engine, an engine speed controlling electric motor, a control circuit therefor, an interrupter in said circuit actuated by, and at a frequency proportional to the speed of said member, a delay opening relay whose solenoid is in said control circuit, and an operating circuit for the speed controlling electric motor controlled in its opening and closing by said relay whereby said electric motor will be energized continuously or for constant intervals of varying frequency accordingly as the interrupter frequency is greater or less than the relay delay.

4. In an engine speed control system, an electrically operated engine speed controller, an operating circuit therefor, a constant speed motor having a wound rotor, an engine driven alternator whose output frequency is proportional to engine speed and which output is fed to said rotor to produce an electromagnetic field rotatable in the direction and speed according to the direction and degree of off-speed between the engine and constant speed motor, an oscillatable stator linked with said field and movable thereby, a member carried by said stator including selective switch means to energize said engine speed controller operating circuit, and an interrupter in said circuit having a frequency of make-and-break proportional to the off-speed condition between the engine speed and the constant speed motor speed.

5. In an engine speed control system, an electrically operated engine speed controller, an operating circuit therefor, a constant speed motor having a wound rotor, an engine driven alternator whose output frequency is proportional to engine speed and which output is fed to said rotor to produce an electromagnetic field rotatable in the direction and speed according to the direction and degree of off-speed between the engine and constant speed motor, an oscillatable stator linked with said field and movable thereby, a member carried by said stator including selective switch means to energize said engine speed controller operating circuit, and an interrupter in said circuit having a dwell of circuit closure proportional to a function of the off-speed condition between the engine speed and the constant speed motor speed.

CHARLES W. CHILLSON.
GEORGE W. BRADY.

REFERENCES CITED

The following references are of record in the file of this patent:

UNITED STATES PATENTS

| Number | Name | Date |
|---|---|---|
| 2,144,429 | Martin | Jan. 17, 1939 |
| 2,217,856 | Brady | Oct. 15, 1940 |
| 2,220,080 | Crane et al. | Nov. 5, 1940 |
| 2,251,388 | Bates | Aug. 5, 1941 |
| 2,232,753 | Wilson | Feb. 25, 1941 |
| 2,231,439 | Dudenhausen | Feb. 11, 1941 |
| 2,076,202 | Lewellyn et al. | Apr. 6, 1937 |
| 2,252,518 | Martin | Aug. 12, 1941 |
| 1,515,227 | Staege | Nov. 11, 1924 |
| 1,553,406 | Staege | Sept. 15, 1925 |
| 1,553,407 | Staege | Sept. 15, 1925 |
| 1,553,408 | Staege | Sept. 15, 1925 |
| 2,246,516 | Herzog | June 24, 1941 |
| 2,112,251 | Pfau | Mar. 29, 1938 |
| 2,151,127 | Logan et al. | Mar. 21, 1939 |